United States Patent
Watts et al.

(10) Patent No.: US 9,765,807 B1
(45) Date of Patent: Sep. 19, 2017

(54) THEFT-RESISTANT TIRE MOUNTING ASSEMBLY

(71) Applicants: Donald Watts, College Park, MD (US); Patricia Gore, College Park, MD (US)

(72) Inventors: Donald Watts, College Park, MD (US); Patricia Gore, College Park, MD (US)

( * ) Notice: Subject to any disclaimer, the term of this patent is extended or adjusted under 35 U.S.C. 154(b) by 0 days.

(21) Appl. No.: 15/185,144

(22) Filed: Jun. 17, 2016

(51) Int. Cl.
  *B60B 1/00* (2006.01)
  *F16B 23/00* (2006.01)
  *B60B 1/06* (2006.01)
  *B60B 27/06* (2006.01)

(52) U.S. Cl.
  CPC ........... *F16B 23/0061* (2013.01); *B60B 1/06* (2013.01); *B60B 27/065* (2013.01); *F16B 23/0007* (2013.01); *B60B 2900/3318* (2013.01)

(58) Field of Classification Search
  CPC ........................ F16B 23/0061; F16B 23/0007; F16B 23/003; F16B 41/005; B60B 27/065; B60B 1/06; B60B 2900/3318; B60B 3/14; B60B 3/147; B60B 3/16; B60B 3/165
  USPC ................ 301/35.621, 35.622, 37.2, 63.101; 411/910, 403, 433, 405, 427, 432, 533
  See application file for complete search history.

(56) References Cited

U.S. PATENT DOCUMENTS

| | | | |
|---|---|---|---|
| 4,521,146 A | 6/1985 | Wharton | |
| 4,645,397 A | 2/1987 | Howe | |
| 4,869,633 A * | 9/1989 | Hayashi | B25B 13/065 301/114 |
| 4,897,008 A * | 1/1990 | Parks | B25B 13/065 411/431 |
| 5,112,176 A * | 5/1992 | McCauley | F16B 41/005 411/432 |
| 5,163,797 A | 11/1992 | Patti | |
| 5,810,532 A | 9/1998 | Huang | |
| 6,419,326 B1 | 7/2002 | Rains | |
| 6,719,511 B2 * | 4/2004 | Notaro | F16B 23/0007 411/372.6 |
| 7,004,700 B2 | 2/2006 | Wilson | |
| 8,525,653 B1 * | 9/2013 | Bing | B60B 7/16 116/28 R |
| D713,714 S | 9/2014 | Kishida | |
| 2008/0044254 A1 * | 2/2008 | Wilson | F16B 23/0007 411/429 |

* cited by examiner

Primary Examiner — S. Joseph Morano
Assistant Examiner — Jean Charleston

(57) ABSTRACT

A theft-resistant tire mounting assembly for deterring theft of wheels includes a wheel rim. Recesses are positioned proximate to a center of the wheel rim. An opening is centrally positioned in each recess. Nuts are configured to threadedly couple to the stud bolts of a wheel hub. One nut comprises a locknut, which has a second end that comprises an exposed face. A perimeter of the exposed face is complementary to the opening, and a keyhole is positioned in the exposed face. The assembly includes an adapter that has a key end, which is complementary to the exposed face. The locknut is incompatible with the socket of the tire iron, and a wrench is not couplable to a locknut that is threaded to the stud bolt. The key end is positioned to couple to the exposed face such that torque from the tire iron is transferable to the locknut.

9 Claims, 5 Drawing Sheets

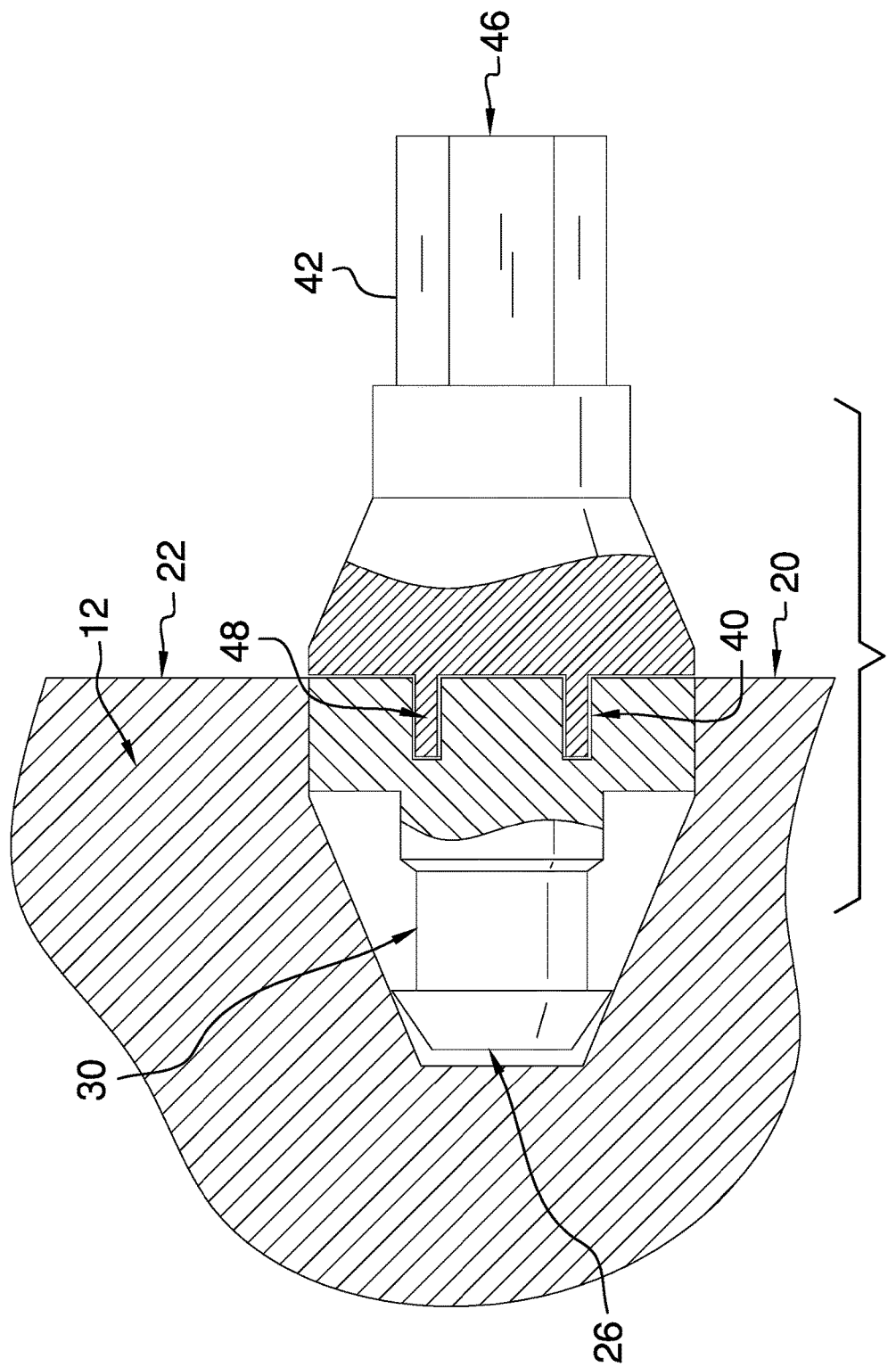

THEFT-RESISTANT TIRE MOUNTING ASSEMBLY

BACKGROUND OF THE DISCLOSURE

Field of the Disclosure

The disclosure relates to tire mounting assemblies and more particularly pertains to a new tire mounting assembly for deterring theft of wheels from a vehicle.

SUMMARY OF THE DISCLOSURE

An embodiment of the disclosure meets the needs presented above by generally comprising a wheel rim. Recesses are positioned proximate to a center of the wheel rim. An opening is centrally positioned in each recess. Nuts are configured to threadedly couple to the stud bolts of a wheel hub. One nut comprises a locknut, which has a second end that comprises an exposed face. A perimeter of the exposed face is complementary to the opening, and a keyhole is positioned in the exposed face. The assembly includes an adapter that has a key end, which is complementary to the exposed face. The locknut is incompatible with the socket of the tire iron, and a wrench is not couplable to a locknut that is threaded to the stud bolt. The key end is positioned to couple to the exposed face such that torque from the tire iron is transferable to the locknut.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a cross-sectional view of an embodiment of the disclosure.

DESCRIPTION OF THE PREFERRED EMBODIMENT

Figure 1:
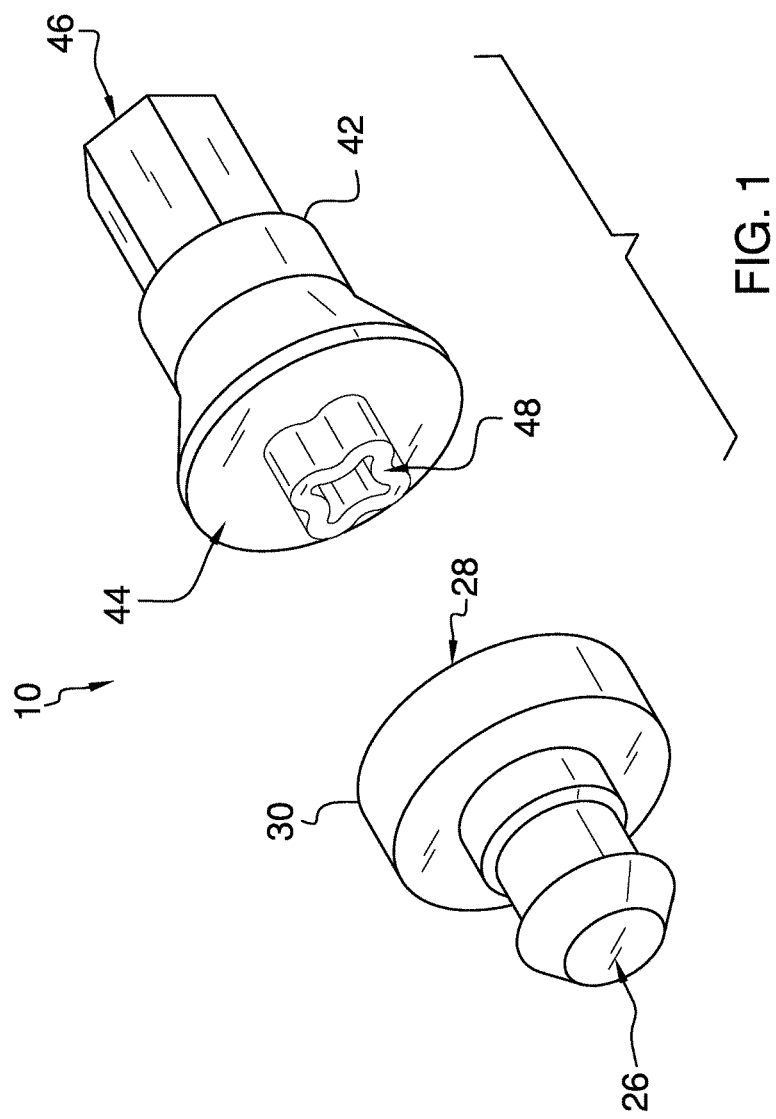
FIG. 1 is an isometric perspective view of a theft-resistant tire mounting assembly according to an embodiment of the disclosure.
Figure 2:
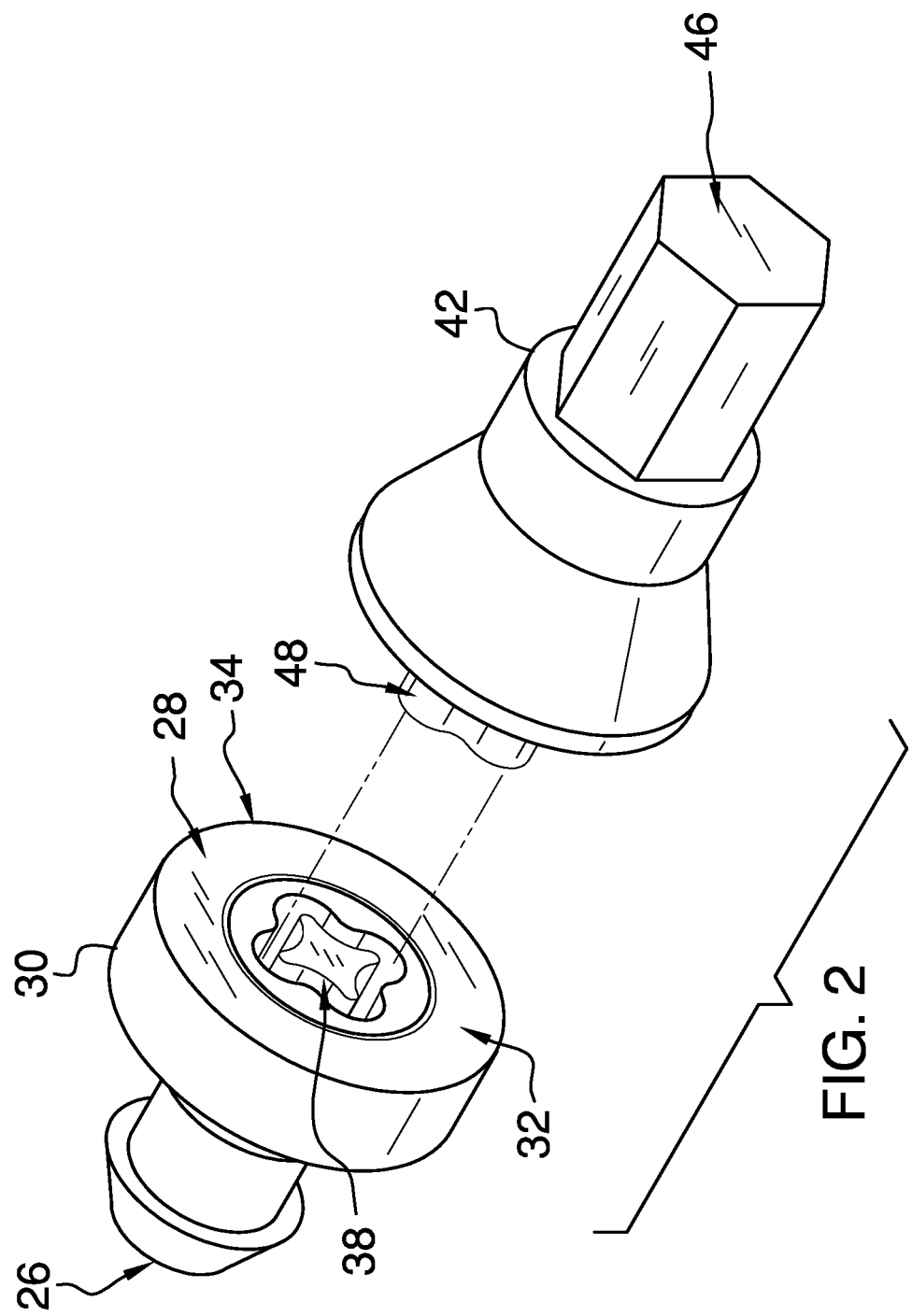
FIG. 2 is an isometric perspective view of an embodiment of the disclosure.
Figure 3:
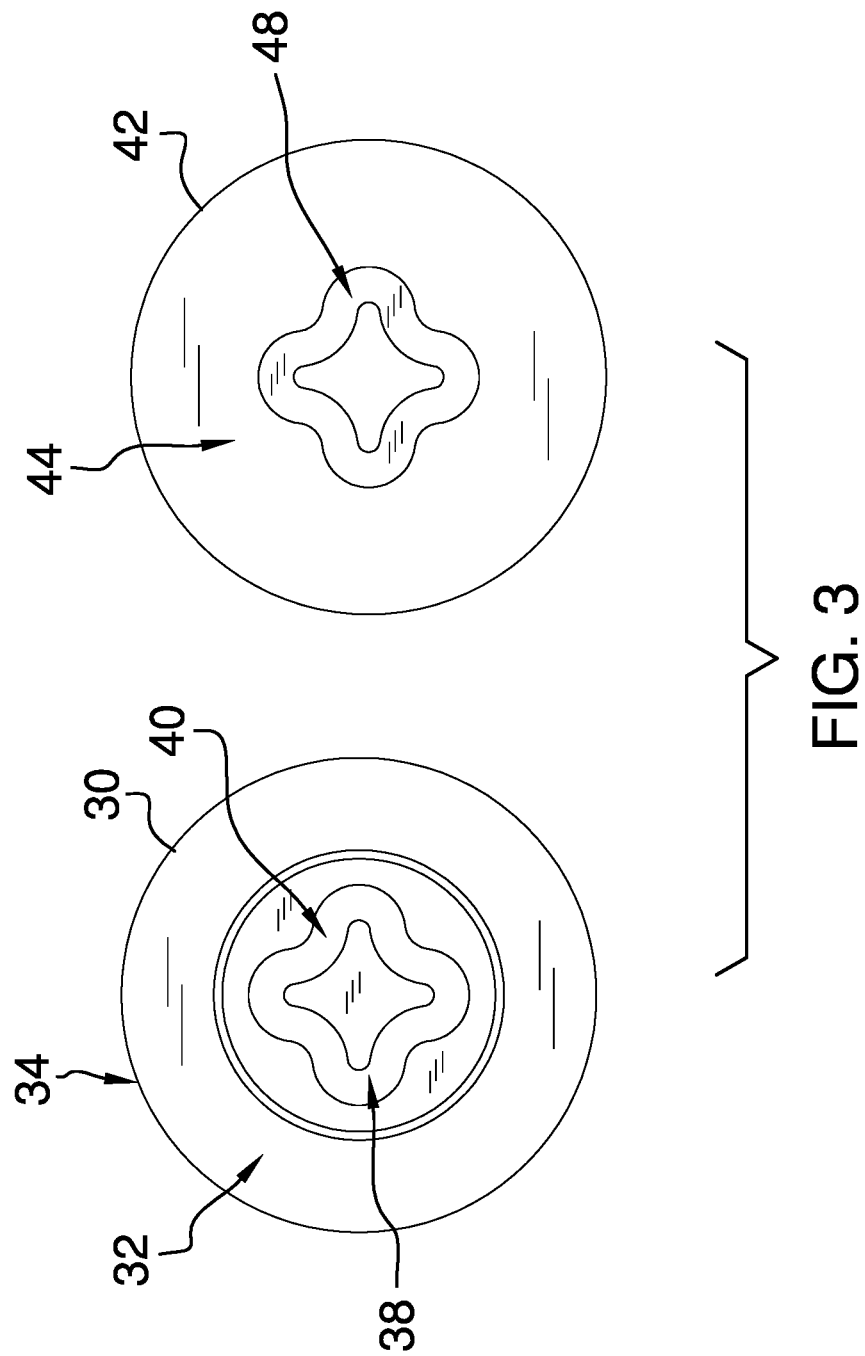
FIG. 3 is an end view of an embodiment of the disclosure.
Figure 4:
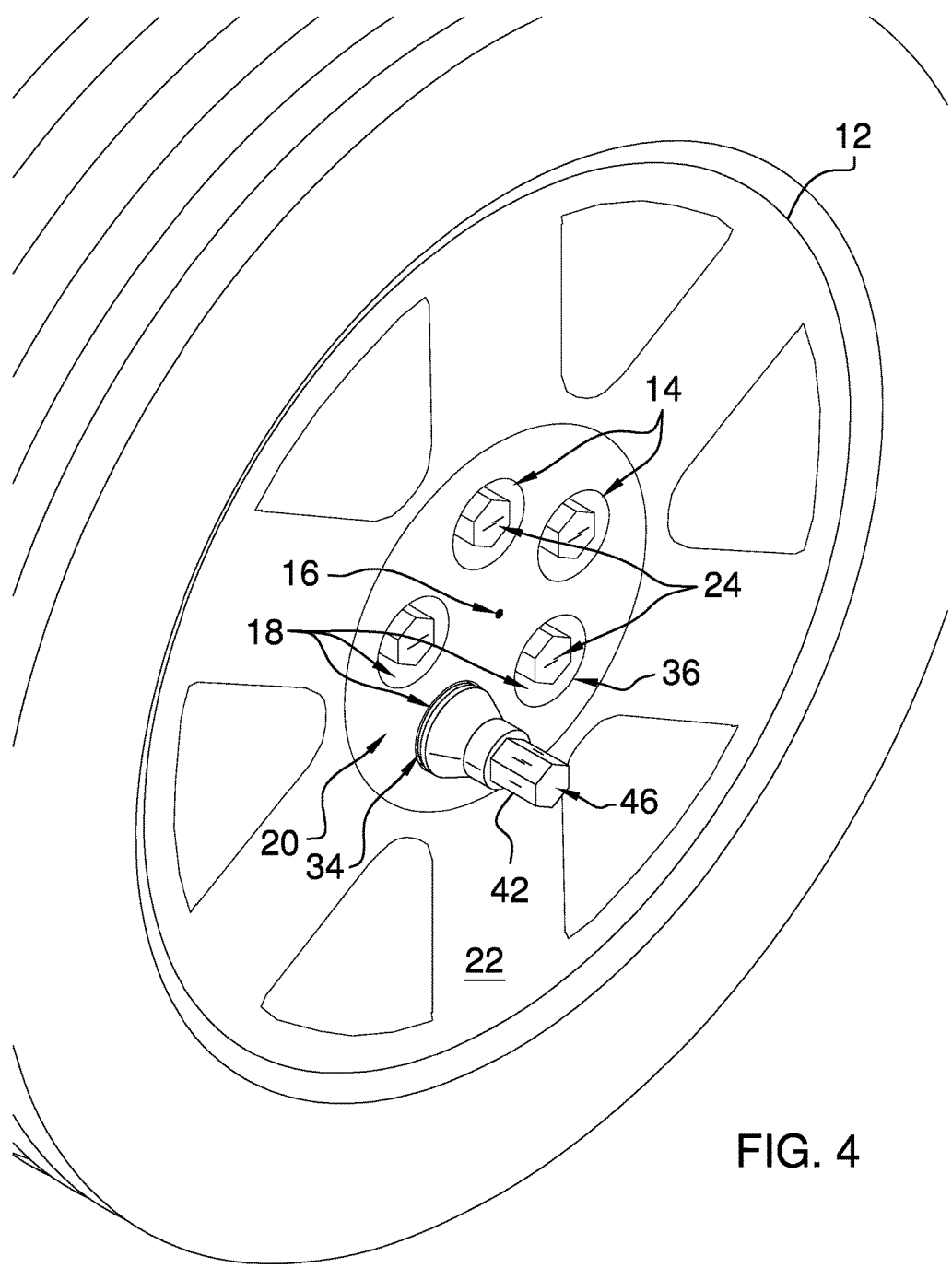
FIG. 4 is an in-use view of an embodiment of the disclosure.

With reference now to the drawings, and in particular to FIGS. 1 through 5 thereof, a new tire mounting assembly embodying the principles and concepts of an embodiment of the disclosure and generally designated by the reference numeral 10 will be described.

As best illustrated in FIGS. 1 through 5, the theft-resistant tire mounting assembly 10 generally comprises a wheel rim 12. The wheel rim 12 comprises a plurality of recesses 14. Each recess 14 is positioned proximate to a center 16 of the wheel rim 12. Each of a plurality of openings 18 is centrally positioned in a respective recess 14. The recesses 14 and the openings 18 are substantially circularly shaped when viewed perpendicularly from the wheel rim 12. Each recess 14 is positioned in an outside face 22 of the wheel rim 12. Each recess 14 is positioned in the wheel rim 12, such that each opening 18 is positioned for insertion of a respective stud bolt that extends from a wheel hub of a vehicle.

A plurality of nuts 24 is configured to threadedly couple to the stud bolts of the wheel hub. Each nut 24 has a first end 26 and a second end 28. The first end 26 is complementary to a respective stud bolt, such that the nut 24 is threadedly couplable to the respective stud bolt to couple the wheel rim 12 to the vehicle. The second end 28 is complementary to a socket of a tire iron. The second end 28 is hexagonally shaped when viewed longitudinally.

At least one of the plurality of nuts 24 comprises a locknut 30. The second end 28 of the locknut 30 comprises an exposed face 32. A perimeter 34 of the exposed face 32 is complementary to the opening 18. The locknut 30 is incompatible with the socket of the tire iron, and a wrench is not positionable around the exposed face 32 of the locknut 30 when the locknut 30 is threadedly coupled to the stud bolt. The perimeter 34 of the exposed face 32 is positioned immediately adjacent to a circumference 36 of the opening 18 when the locknut 30 is threadedly coupled to the stud bolt. Positioned such, a wrench is not positionable around the perimeter 34 of the exposed face 32 when the locknut 30 is threadedly coupled to the stud bolt. A keyhole 38 is positioned in the exposed face 32 of the locknut 30. The keyhole 38 comprises a unique indentation 40.

The assembly 10 also comprises an adapter 42. The adapter 42 has a key end 44 and a hexagonal end 46. The key end 44 is complementary to the exposed face 32 and the hexagonal end 46 is complementary to the socket of the tire iron. The key end 44 comprises an extrusion 48 that is complementary to the unique indentation 40.

In use, the locknut 30 is incompatible with the socket of the tire iron as the exposed face 32 is substantially circular. Additionally, the perimeter 34 of the exposed face 32 is positionable immediately adjacent to the circumference 36 of the opening 18, so a wrench is not positionable around the exposed face 32 of the locknut 30 when the locknut 30 is threadedly coupled to the stud bolt. The adapter 42 is configured for insertion of the hexagonal end 46 into the socket of the tire iron. The extrusion 48 is positioned for insertion into the unique indentation 40. The adapter 42 thus is configured to transfer clockwise torque from the tire iron to the locknut 30, to tighten the locknut 30, and to transfer counter-clockwise torque from the tire iron to the locknut 30 to loosen the locknut 30. As the extrusion 48 corresponds to a unique indentation 40 on the exposed face 32, an unlimited number of locknut 30 and adapter 42 combinations are possible.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A theft-resistant tire mounting assembly comprising:
   a wheel rim, said wheel rim comprising:
     a plurality of recesses, each said recess being positioned proximate to a center of said wheel rim,
     a plurality of openings, each said opening being centrally positioned in a respective said recess, wherein each said opening is positioned in said wheel rim for insertion of a respective stud bolt extending from a wheel hub of a vehicle; and
   a plurality of nuts, said nuts being configured to threadedly couple to the stud bolts of a wheel hub;
   at least one of said plurality of nuts comprising a locknut, a second end of said locknut comprising an exposed face, a perimeter of said exposed face being complementary to said opening;
   a keyhole, said keyhole being positioned in said exposed face of said locknut;
   an adapter, said adapter having a key end and a hexagonal end, said key end being complementary to said exposed face, said hexagonal end being complementary to the socket of the tire iron;
   wherein said locknut is incompatible with the socket of the tire iron and such that a wrench is not positionable around said exposed face of said locknut when said locknut is threadedly coupled to the stud bolt, and wherein said key end is positioned to couple to said exposed face such that torque from the tire iron is transferable to said locknut.

2. The assembly of claim 1, further including said recesses being substantially circularly shaped when viewed perpendicularly from said wheel rim.

3. The assembly of claim 1, further including said openings being substantially circularly shaped when viewed perpendicularly from said wheel rim.

4. The assembly of claim 1, further including each said nut comprising:
   a first end and, said first end being complementary to a respective stud bolt, such that said nut is threadedly couplable to the respective stud bolt to couple said wheel rim to the vehicle; and
   a second end, said second end being complementary to a socket of a tire iron.

5. The assembly of claim 4, further including said second end being hexagonally shaped when viewed longitudinally.

6. The assembly of claim 1, further including said exposed face having a perimeter, said perimeter being positioned immediately adjacent to a circumference of said opening when said locknut is threadedly coupled to the stud bolt, such that a wrench is not positionable around said perimeter of said exposed face when said locknut is threadedly coupled to the stud bolt.

7. The assembly of claim 1, further including said keyhole comprising a unique indentation, said unique indentation being positioned in said exposed face of said locknut.

8. The assembly of claim 7, further including said key end of said adapter comprising an extrusion, said extrusion being complementary to said unique indentation.

9. A theft-resistant tire mounting assembly comprising:
   a wheel rim, said wheel rim comprising:
     a plurality of recesses, each said recess being positioned proximate to a center of said wheel rim, said recesses being substantially circularly shaped when viewed perpendicularly from said wheel rim,
     a plurality of openings, each said opening being centrally positioned in a respective said recess, wherein each said opening is positioned in said wheel rim for insertion of a respective stud bolt extending from a wheel hub of a vehicle, said openings being substantially circularly shaped when viewed perpendicularly from said wheel rim, and
     a wheel rim, said wheel rim being centrally positioned in an outside face of said wheel rim, said wheel rim being substantially circularly shaped, said wheel rim being substantially flat, each said recess being positioned in said wheel rim;
   a plurality of nuts, said nuts being configured to threadedly couple to the stud bolts of a wheel hub, each said nut having a first end and a second end, said first end being complementary to a respective stud bolt, such that said nut is threadedly couplable to the respective stud bolt to couple said wheel rim to the vehicle, said second end being complementary to a socket of a tire iron, said second end being hexagonally shaped when viewed longitudinally;
   at least one of said plurality of nuts comprising a locknut, said second end of said locknut comprising an exposed face, a perimeter of said exposed face being complementary to said opening, wherein said locknut is incompatible with the socket of the tire iron and such that a wrench is not positionable around said exposed face of said locknut when said locknut is threadedly coupled to the stud bolt;
   said exposed face having a perimeter, said perimeter being positioned immediately adjacent to a circumference of said opening when said locknut is threadedly coupled to the stud bolt, such that a wrench is not positionable around said perimeter of said exposed face when said locknut is threadedly coupled to the stud bolt;
   a keyhole, said keyhole being positioned in said exposed face of said locknut, said keyhole comprising a unique indentation, said unique indentation being positioned in said exposed face of said locknut;
   an adapter, said adapter having a key end and a hexagonal end, said key end being complementary to said exposed face, said hexagonal end being complementary to the socket of the tire iron, said key end comprising an extrusion, said extrusion being complementary to said unique indentation; and
   wherein said locknut is incompatible with the socket of the tire iron and such that a wrench is not positionable around said exposed face of said locknut when said locknut is threadedly coupled to the stud bolt, wherein said adapter is configured for insertion of said hexagonal end into the socket of the tire iron, and wherein said extrusion is positioned for insertion into said unique indentation, such that said adapter is configured to transfer clockwise torque from the tire iron to said locknut to tighten said locknut and wherein said adapter is configured to transfer counter-clockwise torque from the tire iron to said locknut to loosen said locknut.

\* \* \* \* \*